UNITED STATES PATENT OFFICE.

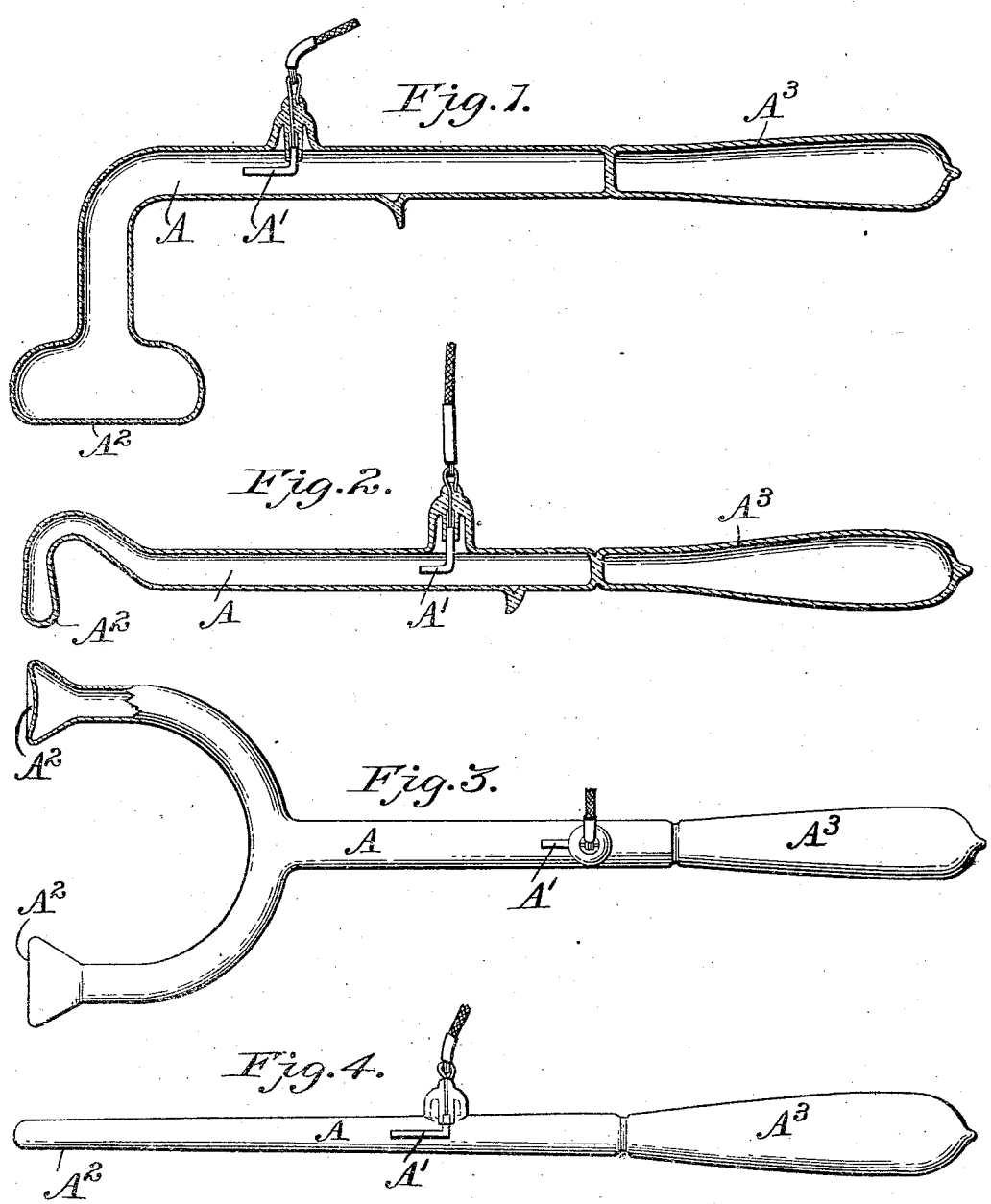

HENRY GIBSON O'NEILL, OF NEW YORK, N. Y., ASSIGNOR OF TWENTY-NINE THIRTY-SECONDS TO JOHN ROONEY, OF SAME PLACE, AND ALEXANDER ARNOIS, OF PHILADELPHIA, PENNSYLVANIA.

VACUUM-ELECTRODE FOR THERAPEUTIC PURPOSES.

SPECIFICATION forming part of Letters Patent No. 628,352, dated July 4, 1899.

Application filed October 15, 1898. Serial No. 693,682. (No model.)

*To all whom it may concern:*

Be it known that I, HENRY GIBSON O'NEILL, a subject of the Queen of Great Britain, and a resident of New York, in the county of New York and State of New York, have invented certain new and useful Improvements in Vacuum-Electrodes for Therapeutic Purposes; and I do declare the following to be a full, clear, and exact description of the invention, such as will enable others skilled in the art to which it appertains to make and use the same, reference being had to the accompanying drawings, and to letters of reference marked thereon, which form a part of this specification.

This invention appertains to the art of electrotherapy, and is designed, mainly, to afford a simple and effective means for producing electrical asepsis and stimulation without any of the unpleasant physiological effects incident to the use of electricity for therapeutic purposes. The principle involved in this system of electrical asepsis and stimulation is the production of nascent ozone surrounding and within the diseased surface, thereby oxidizing the micro-organisms or other toxic matter present, while stimulating healthy granulation by molecular bombardment.

The process consists in directing high-tension currents of electricity through a unipolar vacuum-electrode of glass or other vitreous material against the affected parts, thereby decomposing not only the air surrounding but occluded within the same, resolving the molecules of oxygen into their atoms and reconstructing them into a new group represented by $O_3$, (ozone.) Ozone in this nascent form is very much more energetic than in a free state and produces instant oxidation of all diseased matter. This form of asepsis is applicable to the entire tract of a wound or diseased surface at any depth. It is fatal to all germ life and affords a means of internal asepsis for which there can be no substitute in the very nature of things.

The manner of carrying out this system is through an electrode of glass, having an interior vacuum and one pole in connection with a source of high-tension currents of electricity.

The specific form of electrode or instrument will vary according to the organ involved or part affected.

In the accompanying drawings, Figure 1 illustrates one form adapted generally to treatment of a wound or diseased surface on the body; Fig. 2, a form for treating catarrh or other forms of diseases of the ear; Fig. 3, a form for certain eye diseases, and Fig. 4 a form where the nose is involved.

While all necessarily vary in form, they embody the same essentials. They are in each case made of glass. The contact-surface of each is characteristic of its function. In each case this contact-surface is exterior of a vacuum.

In the drawings, A designates a vacuum-chamber, and A' a sealed-in terminal entering the chamber A.

$A^2$ is the contact-surface, and $A^3$ is any suitable non-conducting handle. I prefer to have it either of solid glass or of glass filled with air.

The one pole or terminal A' is connected with a source of high-tension current. The electrode is then brought near or in contact with the diseased surface. The current entering the vacuum-chamber is attenuated, and impelled by its potential passes through the contact-wall of glass to the person so softened in its action as to be unfelt, while it produces nascent ozone *in situ* and stimulates healthy action and the reparative processes.

Any current of sufficiently high tension will suffice. I prefer, however, to employ a current having a wave approaching as nearly as possible to the sine curve.

What I claim as new, and desire to secure by Letters Patent, is—

1. A unipolar electrode of glass or other vitreous material, containing a vacuum-chamber, having an exterior contact-surface, and a single sealed-in terminal designed for connection with a source of high-tension electrical current, substantially as specified.

2. The apparatus for electric asepsis and stimulation which consists of an electrode of glass having a non-conducting handle; a contact-surface exterior of a vacuum-chamber, and one pole connected with a source of high-tension energy, substantially as set forth.

In testimony whereof I affix my signature in presence of two witnesses.

HENRY GIBSON O'NEILL.

Witnesses:
G. M. ANDERSON,
GEO. H. PARMELEE